(No Model.)
F. PLUMB.
DITCHING MACHINE.
No. 293,780. Patented Feb. 19, 1884.
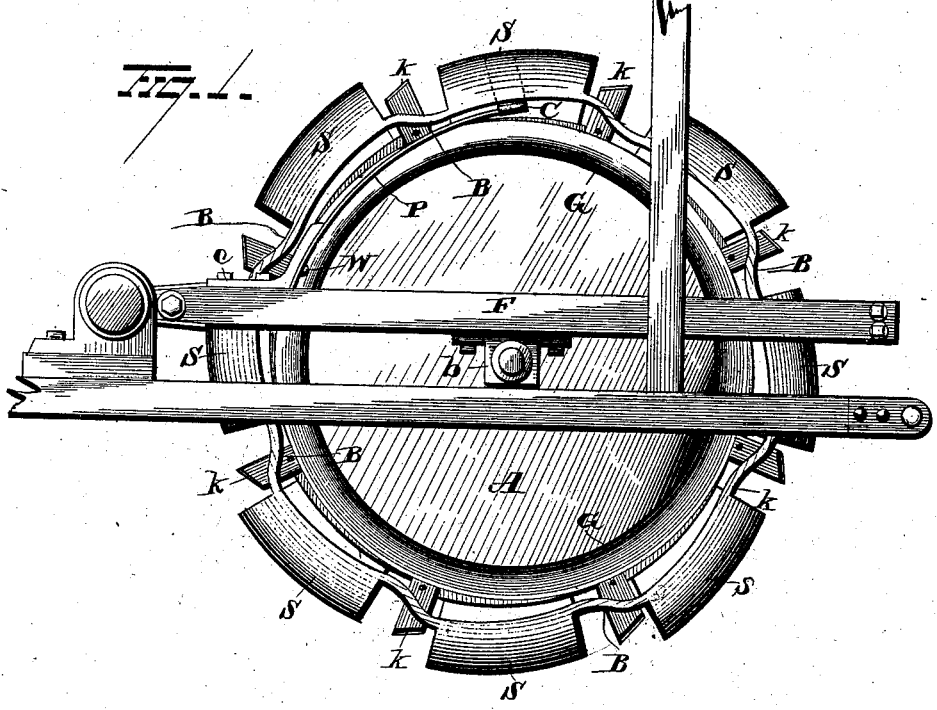
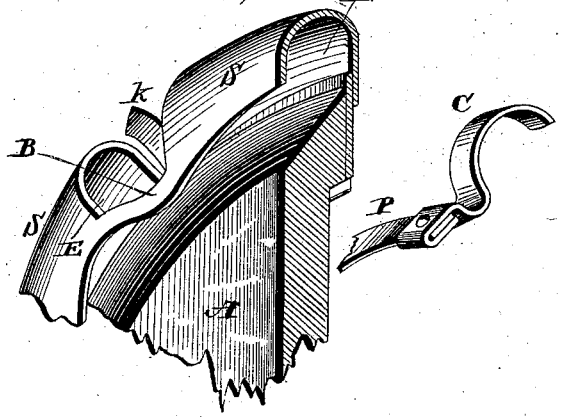
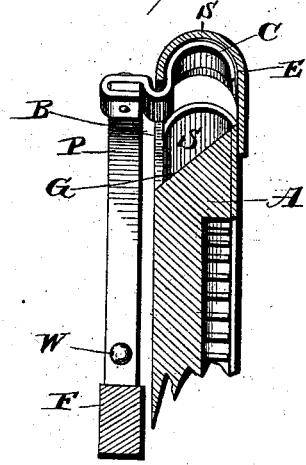
WITNESSES
E. J. Nottingham
Geo. F. Downing
INVENTOR
Fawcett Plumb
By H A Symons,
Attorney
N. PETERS. Photo-Lithographer, Washington, D. C.

UNITED STATES PATENT OFFICE.

FAWCETT PLUMB, OF STREATOR, ILLINOIS.

DITCHING-MACHINE.

SPECIFICATION forming part of Letters Patent No. 293,780, dated February 19, 1884.

Application filed October 17, 1883. (No model.)

*To all whom it may concern:*

Be it known that I, FAWCETT PLUMB, of Streator, in the county of La Salle and State of Illinois, have invented certain new and useful Improvements in Ditching-Machines; and I do hereby declare the following to be a full, clear, and exact description of the invention, such as will enable others skilled in the art to which it appertains to make and use the same.

My invention relates to an improvement in ditching-machines, the object being to provide means whereby scoops or a continuous scoop attached to the periphery of a wheel may be kept free from adhering substances.

My invention consists, first, in a series of scoops attached to the periphery of a wheel, each scoop being open at both ends, and the entire series of scoops being attached to one another at their outer corners; secondly, in the combination, with a series of scoops, each open at its opposite ends and secured to one another so as to operate as a continuous scoop, of a scraper constructed and arranged to engage the inner surfaces of said scoops and keep them free of adhering substances; thirdly, in certain features of construction and combinations of parts, as will be fully described, and pointed out in the claims.

In the accompanying drawings, Figure 1 is a view in side elevation of a portion of the ditching-machine embodying my invention. Fig. 2 is a detached view of the scraper and one section of the continuous scoop; and Fig. 3 is a transverse section of the scraper and scoop, representing the scraper in its position in the scoop.

A represents a wheel journaled to the vertically-adjustable frame F by means of the depending brackets $b\ b$. This frame is adapted to be vertically adjusted; but any approved means for adjusting the frame and for propelling the machine and operating the scoops may be resorted to—an instance of such mechanism being shown and described in Letters Patent No. 244,400, granted to me July 19, 1881—and hence such parts are not herein shown or described, as they form no part of my present invention. The wheel A is provided at its circumference with the inclined flange G. Along the outer edge of this flange the knives $k\ k$ and inner sides of the scoops S S are alternately attached. The knives $k\ k$ are attached at suitable intervals and in positions radiating from the center of the wheel. The scoops S S are semicircular or of equivalent form in cross-section. They are open at both ends, the rear end of one scoop at its outer corner being firmly fastened to the forward end of the next preceding scoop at its outer corner by the bands B B. Thus the several scoop-sections S S are combined into one, and an open space, E, is left between the flange and outer edges of the sections S S entirely around the wheel. The knives $k\ k$ occupy positions a little in advance of the digging ends of the scoops, and serve to cleave a portion of earth from the mass for the scoop to pick up. The digging ends of the scoops are set out a little farther from the center of the wheel than the rear ends, thereby allowing each one to load as the wheel rotates and the machine moves forward.

C represents a scraper adapted to conform transversely to the inner surface of the scoop, and is removably secured to one end of the spring P. This spring is secured to the frame F by means of the knee-bracket $c$. The spring is pivotally attached to this bracket by the screw $w$ or other suitable fastening. An inclined table or way (not shown) can be secured to the frame of the machine for the purpose of carrying off the earth to one side of the ditch as fast as it falls from the scoops. When the scraper is in position, the spring P presses upward and causes the scraper to follow the bottom of the scoop as the wheel rotates. The bands B B, which bind together the outer corners of the scoops, serve to hold them firmly in position, and at the same time act as guides to keep the scraper in position while passing from one scoop-section to another, by engaging in a depression near that end of the scraper which is secured to the spring. The spring being laterally movable on the screw, the scraper may be removed from the scoop for any purpose by pressing down and outward. This spring-support of the scraper also allows it to move over any little irregularities in the bottom of the scoop without injury. Heretofore in machines of this kind there has been a liability of the scoops becoming foul with clay or some other sticky earth. From the foregoing it will be seen that I have now provided against this by opening the scoops at the rear end and combining them into a continuous scoop composed of several sections, and introducing a scraper which automatically adjusts itself to the inner surfaces of these sections successively, keeping them free from any loading of that kind.

I do not confine myself to the exact construction and arrangement of parts shown and described, as it is evident that slight changes may be made without departing from the spirit of my invention.

Having fully described my invention, what I claim as new, and desire to secure by Letters Patent, is—

1. In a ditching-machine, the cutting-wheel thereof consisting, essentially, of a series of open-ended scoops attached to the periphery of the wheel, and cutters situated between the adjacent ends of the scoops.

2. The combination, with a series of scoops bound together at their outer corners, so as to form a continuous scoop, the said connections between the scoops forming a guide for the spring-actuated scraper, of a spring-actuated scraper adapted to move in contact with the inner surfaces of the scoops, substantially as set forth.

3. In a ditching-machine, the combination, with a series of open-ended scoops provided with bands uniting their outer corners, and cutters located between the adjacent ends of the scoops, of a pivoted spring-pressed scraper, substantially as set forth.

In testimony whereof I have signed this specification in the presence of two subscribing witnesses.

FAWCETT PLUMB.

Witnesses:
P. M. LUKINS,
JAS. G. WILSON.